US011482030B2

(12) United States Patent
Ionescu et al.

(10) Patent No.: US 11,482,030 B2
(45) Date of Patent: Oct. 25, 2022

(54) SYSTEM AND METHOD FOR AUTOMATIC DETECTION AND RECOGNITION OF PEOPLE WEARING PERSONAL PROTECTIVE EQUIPMENT USING DEEP LEARNING

(71) Applicant: SecurifAI LLC, Azuga (RO)

(72) Inventors: Radu Tudor Ionescu, Galați (RO); Mariana Iuliana Georgescu, Bucharest (RO); Adrian Șandru, Galați (RO); Georgian-Emilian Duță, Argeș (RO)

(73) Assignee: SecurifAI LLC, Azuga (RO)

( * ) Notice: Subject to any disclaimer, the term of this patent is extended or adjusted under 35 U.S.C. 154(b) by 59 days.

(21) Appl. No.: 16/996,668

(22) Filed: Aug. 18, 2020

(65) Prior Publication Data
US 2022/0058381 A1 Feb. 24, 2022

(51) Int. Cl.
*G06V 40/10* (2022.01)
*G06V 30/194* (2022.01)
*G08B 21/02* (2006.01)

(52) U.S. Cl.
CPC ............ *G06V 40/10* (2022.01); *G06V 30/194* (2022.01); *G08B 21/02* (2013.01)

(58) Field of Classification Search
None
See application file for complete search history.

(56) References Cited

U.S. PATENT DOCUMENTS 5,164,707 A 11/1992 Rasmussen et al.
9,695,981 B2 7/2017 Au et al.
(Continued)

FOREIGN PATENT DOCUMENTS

AU 2016316932 3/2017
WO 2016154765 10/2016
(Continued)

OTHER PUBLICATIONS

Shubham Kumar, et al.,"Automatic Helmet Detection in Real-Time and Surveillance Video" Springer Nature Singapore Pte Ltd. 2020, 51-60.
(Continued)

*Primary Examiner* — Santiago Garcia
(74) *Attorney, Agent, or Firm* — Leason Ellis LLP

(57) ABSTRACT

A system and method for determining whether persons depicted in images are wearing personal protective equipment (PPE) is disclosed. The system includes a PPE detection platform that, during a testing phase, comprises a person detector configured to detect persons in images and a deep neural network PPE classifier. The PPE classifier comprises a spatial attention module and is trained to predict whether or not a PPE item is present in the image sub-region corresponding to the detected person. During a training phase, the PPE detection platform comprises a body pose estimator that, based on the output of the person detector, determines a pose of the detected person's body and provides a spatial attention supervision signal used to train the spatial attention module of the PPE classifier and tune the PPE classifier. The PPE platform is configured to bypass the body pose estimator during the inference phase.

15 Claims, 6 Drawing Sheets

(56) References Cited

U.S. PATENT DOCUMENTS

| | | | |
|---|---|---|---|
| 9,952,046 | B1 | 4/2018 | Blacutt et al. |
| 10,489,683 | B1* | 11/2019 | Koh .................. G06N 3/08 |
| 11,056,242 | B1* | 7/2021 | Jain .................. G16H 50/70 |
| 2009/0040014 | A1 | 2/2009 | Knopf et al. |
| 2009/0161918 | A1* | 6/2009 | Heller .................. G07C 9/38 382/115 |
| 2010/0045464 | A1 | 2/2010 | Knopf et al. |
| 2010/0245554 | A1* | 9/2010 | Nam .................. H04N 7/18 348/E5.042 |
| 2014/0307076 | A1* | 10/2014 | Deutsch .................. F16P 3/147 348/77 |
| 2016/0204835 | A1* | 7/2016 | Farioli Brioschi .... G08B 21/02 340/3.1 |
| 2019/0213856 | A1* | 7/2019 | Taylor .................. G07C 9/00182 |
| 2020/0319015 | A1* | 10/2020 | Kamiyama .......... A61B 5/7264 |
| 2021/0248400 | A1* | 8/2021 | Cronje .................. G06V 40/174 |
| 2021/0248514 | A1* | 8/2021 | Cella .................. G06Q 30/0201 |
| 2021/0344852 | A1* | 11/2021 | Isberg .................. G01J 3/021 |
| 2021/0383623 | A1* | 12/2021 | Tokman ............... G06N 3/049 |
| 2022/0044070 | A1* | 2/2022 | Koh .................. G06V 10/40 |

FOREIGN PATENT DOCUMENTS

| | | |
|---|---|---|
| WO | 2017062030 | 4/2017 |
| WO | 2017164886 | 9/2017 |

OTHER PUBLICATIONS

International Search Report and Written Opinion for International Patent Application No. PCT/IB2021/055514, dated Sep. 21, 2021. 13 pages.

Chen S., et al. "A Vision-Based Approach for Ensuring Proper Use of Personal Protective Equipment (PPE) in Decommissioning of Fukushima Daiichi Nuclear Power Station." Applied Sciences. 2020; 10(15):5129. 14 pages.

Santiago Barro-Torres, et al.,"Real-time personal protective equipment monitoring system" Computer Communications (2012) 42-50.

Aphinya Chairat, et al.,"Low Cost, High Performance Automatic Motorcycle Helmet Violation Detection" Computer Vision Foundation, pp. 3560-3568.

Kunal Dahiya, et al., "Automatic Detection of Bike-riders without Helmet using Surveillance Videos in Real-time" International Joint Conference on Neural Networks, Jul. 2016, 7 pages.

Madhuchhanda Dasgupta, et al., "Automated Helmet Detection for Multiple Motorcycle Riders using CNN" 2019 IEEE Conference on Information and Communication Technology (CICT), 4 pages.

Qi Fang, et al., "Detecting non-hardhat-use by a deep learning method from far-field surveillance videos" Automation in Construction 85 (2018) pp. 1-9.

Debabrata Swain, et al. "An Efficient Heart Disease Prediction System Using Machine Learning" Machine Learning and Information Processing, Advances in Intelligent Systems and Computing 1101, (2020); pp. 39-50.

Jie Li, et al. "Safety Helmet Wearing Detection Based on Image Processing and Machine Learning" 2017 Ninth International Conference on Advanced Computational Intelligence (ICACI) Feb. 4-6, 2017, pp. 201-205.

Bahaa Eddine Mneymneha, et al., "Automated Hardhat Detection for Construction Safety Applications" Procedia Engineering 196 (2017) 895-902.

Bahaa Eddine Mneymneh, et al., "Vision-Based Framework for Intelligent Monitoring of Hardhat Wearing on Construction Sites" J. Comput. Civ. Eng., 2019, 33(2, pp. 1-20.

Rafael Mosberger, et al., "Multi-band Hough Forests for Detecting Humans with Reflective Safety Clothing from Mobile Machinery", 7 pages.

Rafael Mosberger, et al., "A Customized Vision System for Tracking Humans Wearing Reflective Safety Clothing from Industrial Vehicles and Machinery" Sensors 2014, 14, 17952-17980.

Nipun D. Natha, et al., "Deep learning for site safety: Real-time detection of personal protective equipment" Automation in Construction 112 (2020), pp. 1-20.

Kishor Shrestha, et al., "Hard-Hat Detection for Construction Safety Visualization" Hindawi Publishing Corporation Journal of Construction Engineering vol. 2015, Article ID 721380, 8 pages, http://dx.doi.org/101155/2015/721380.

Romuere Silva, et al. "Helmet Detection on Motorcyclists Using Image Descriptors and Classifiers" 2014 27th SIBGRAPI Conference on Graphics, Patterns and Images, pp. 141-148.

Lu Wang, et al., "Hardhat-Wearing Detection Based on a Lightweight Convolutional Neural Network with Multi-Scale Features and a Top-Down Module" Sensors 2020, 20,1868; pp. 1-16, www.mdpi.com/journal/sensors.

Jixiu Wua, et al. "Automatic detection of hardhats worn by construction personnel: A deep learning approach and benchmark dataset" Automation in Construction 106 (2019) 102894, pp. 1-7.

Zaipeng Xie, et al., "A convolutional neural network based approach towards real-time hard hat detection" 2018 IEEE, pp. 430-434.

Faishal Zhafran, "Computer Vision System Based for Personal Protective Equipment Detection, by Using Convolutional Neural Network" 2019 International Electronics Symposium (IES), 2019 IEEE, pp. 516-521.

Hao Wua, "An intelligent vision-based approach for helmet identification for work safety" Computers in Industry 100 (2018) 267-277.

Second International Search Report and Written Opinion for International Patent Application No. PCT/IB2021/055514, dated Apr. 1, 2022, 7 pages.

Ebrahimpour, M.K., Falandays, J.B., Spevack, S., Noelle, D.C. (2019). Do Humans Look Where Deep Convolutional Neural Networks "Attend"?. In:, et al. Advances in Visual Computing. ISVC 2019. Lecture Notes in Computer Science, vol. 11845. Springer, Cham. https://doi.org/10.1007/978-3-030-33723-0_5.

Hang, Renlong & Li, Zhu & Liu, Qingshan & Ghamisi, Pedram & Bhattacharyya, Shuvra. (2020). Hyperspectral Image Classification With Attention-Aided CNNs. IEEE Transactions on Geoscience and Remote Sensing. p. 1-13. 10.1109/TGRS.2020.3007921.

\* cited by examiner

SYSTEM AND METHOD FOR AUTOMATIC DETECTION AND RECOGNITION OF PEOPLE WEARING PERSONAL PROTECTIVE EQUIPMENT USING DEEP LEARNING

FIELD OF THE DISCLOSURE

The present invention relates to object detection systems, in particular, systems and methods for detecting persons wearing personal protective equipment from imagery using deep learning algorithms.

BACKGROUND

In many workplace environments, such as construction sites or oil & gas factories, there are potentially hazardous materials, dangerous chemicals or dangerous equipment (large moving parts, operating cranes), that present health or safety risks for the workers. In order to protect workers against accidents caused in hazardous or dangerous areas, the workers may be required to wear personal protective equipment (PPE). The personal protective equipment may include, but is not limited to, helmets, masks, glasses, coveralls, safety vests, reflective vests, boots, gloves, etc. In many countries, including the U.S., there are governmental regulations that require certain employees to be trained in the proper and effective use of personal protective equipment in hazardous or dangerous working environments. Nevertheless, in many cases the workers choose not to wear personal protective equipment items because these items are uncomfortable, potentially causing sweat or skin irritations, or because these items prevent the workers from executing their tasks with precision, for example screwing or unscrewing a small screw with gloves on. Managing such risks is of utter importance to employers that aim at preventing unnecessary health or safety accidents. In this context, a system, such as the one disclosed in the proposed invention, to automatically monitor the workers and verify if they are permanently wearing the mandatory personal protective equipment is needed.

SUMMARY OF THE DISCLOSURE

According to an aspect of the present disclosure, a system for determining whether persons depicted in images are wearing personal protective equipment is provided. The system comprises a PPE detection platform comprising an input-output interface for receiving images depicting one or more persons. The PPE platform further includes a person detector configured to detect a person depicted in an image among the images and output information representing a location of a portion of the image in which the person is detected. Additionally, the PPE platform includes a personal protective equipment (PPE) classifier. In particular, the PPE classifier is a deep neural network classifier trained to determine whether or not a PPE item is present in the portion of the image in which the person was detected by the person detector. Additionally, the PPE classifier comprises a trained spatial attention module and is configured to generate as output a result of determining whether or not the PPE item is present in the portion of the image.

According to a further aspect of the disclosure, a computer-implemented method for analyzing imagery to detect whether any persons in the image are wearing personal protective equipment (PPE) is disclosed. The method comprises the step of receiving, by a PPE detection platform via an input-output interface during an inference phase, images depicting one or more persons. The method also includes the step of processing, by a person detector of the PPE detection platform, an image among the images to detect a person depicted in the image and output information representing a location of a portion of the image in which the person is detected. The method also includes the step of predicting, with a PPE classifier of the PPE detection platform, whether or not the portion of the image in which the person was detected depicts a person wearing a PPE item. In particular, the PPE classifier is a deep neural network classifier and comprises a spatial attention mechanism. Additionally, the PPE classifier is trained to predict whether images depict one or more persons wearing the PPE item or depict one or more persons not wearing the PPE item as a function of the trained spatial attention mechanism. The method also includes the step of outputting, by the PPE detection platform, the result of the predicting step. In particular, in response to predicting that the image does not depict a person wearing the PPE item, outputting the result includes sending an image rendering signal to cause a computer resource asset to display at least the portion of the image depicting the detected person and an alert indicating that the person is not wearing the PPE item.

According to a further aspect, a non-transitory computer readable storage medium containing computer program instructions for analyzing imagery to detect whether any persons in the image are wearing personal protective equipment (PPE) is disclosed. The program instructions, when executed by a processor, cause the processor to perform a method that comprises the step of receiving, by a PPE detection platform via an input-output interface during an inference phase, images depicting one or more persons. The method also includes the step of processing, by a person detector of the PPE detection platform, an image among the images to detect a person depicted in the image and output information representing a location of a portion of the image in which the person is detected. The method also includes the step of predicting, with a PPE classifier of the PPE detection platform, whether or not the portion of the image in which the person was detected depicts a person wearing a PPE item. In particular, the PPE classifier is a deep neural network classifier and comprises a spatial attention mechanism. Additionally, the PPE classifier is trained to predict whether images depict one or more persons wearing the PPE item or depict one or more persons not wearing the PPE item as a function of the trained spatial attention mechanism. The method also includes the step of outputting, by the PPE detection platform, the result of the predicting step. In particular, in response to predicting that the image does not depict a person wearing the PPE item, outputting the result includes sending an image rendering signal to cause a computer resource asset to display at least the portion of the image depicting the detected person and an alert indicating that the person is not wearing the PPE item.

These and other aspects, features, and advantages can be appreciated from the accompanying description of certain embodiments of the invention and the accompanying drawing figures and claims.

BRIEF DESCRIPTION OF THE DRAWING FIGURES

DESCRIPTION OF CERTAIN EMBODIMENTS OF THE DISCLOSURE

Figure 1:
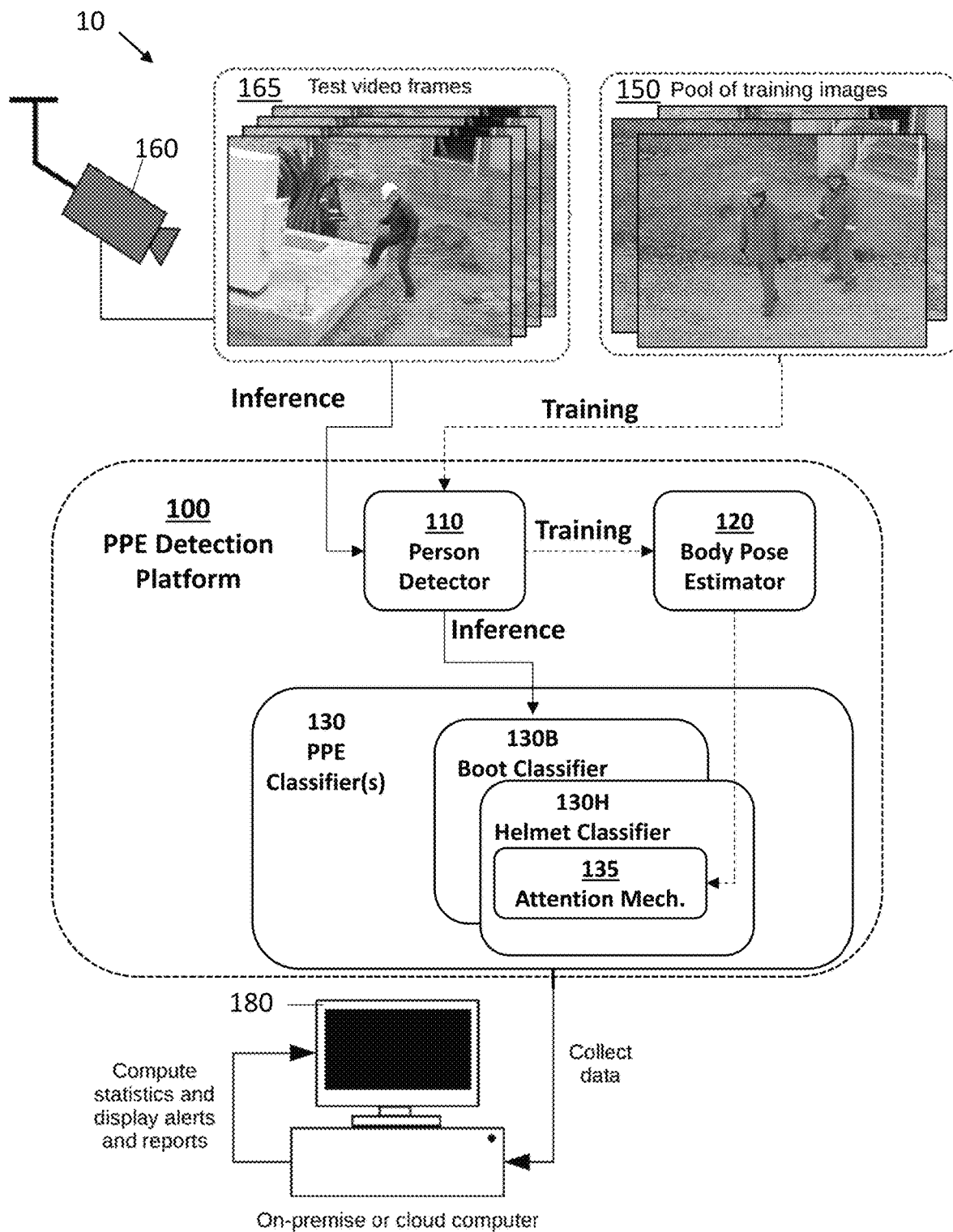
FIG. 1 is a conceptual block diagram illustrating an exemplary personal protective equipment (PPE) detection system and high-level routine for, during a training phase, training the system to detect specific PPE items and, during an inference phase, detecting PPE items in accordance with one or more embodiments of the disclosure.

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

The technology solution provided by this disclosure include a method and system for automatically detecting personal protective equipment (PPE) from imagery based on deep learning. PPE includes but is not limited to apparel, gear or clothing items such as helmets, masks, surgical masks, glasses, coats, coveralls, safety vests, reflective vests, boots, gloves and the like, in images of people. The images, for example, can be video captured by surveillance cameras.

The technology solution provided by this disclosure can effectively and efficiently scan images captured by a camera of an area that might include one or more people in a variety of different poses. The technology solution includes a computer-implemented PPE detection platform that is configured to analyze the images to detect persons in one or more of the image frames and, using one or more deep neural network classifiers, determine whether or not the images depict any PPE items among various different types of PPE items. Ultimately, the platform can predict whether or not the persons in the images are wearing PPE items, what PPE items they are wearing, and provide a degree of confidence associated with the various determinations.

The disclosed invention is a system and method based on machine learning that analyzes images (color images, gray-scale images, video frames, etc.) in order to detect and/or recognize people wearing and people not wearing personal protective equipment. As any other machine learning method, the proposed method is divided into a training phase and a test ("inference") phase. The training phase precedes the inference phase and involves training the PPE detection platform to distinguish images of individuals wearing PPE from images of individuals not wearing PPE. In the inference phase, the trained system is used to analyze images to detect whether or not they depict an individual wearing PPE. Further discussed herein are components and the steps involved in each of the two phases of the proposed method.

The typical approaches for personal protective equipment detection based on deep learning are (1) to train an object detector for the items listed above or (2) to train a person detector and a classifier that takes the bounding boxes predicted by the detector and discriminates between people wearing and people not wearing the corresponding personal protective equipment items. According to a salient aspect of one or more embodiments, the exemplary PPE detection systems and methods implement a different and more accurate solution that uses three components: a person detector (a system that detects people in images), an articulated body pose estimator (a system that estimates the pose of a person with a skeleton) and a classifier (a system that determines if a piece of personal protective equipment is present in an image or not).

FIG. 1 is a high-level diagram illustrating elements of the PPE detection system 10 including the computer-implemented PPE detection platform 100 including the person detector 110, body pose estimator 120 and one or more classifiers 130. As shown in FIG. 1, the PPE detection platform 100 is a computer-implemented system configured to receive images during a training phase from a pool of training images 150, and image frames 165 for analysis during the inference phase. As shown, for example, image frames 165 can comprise video image frames captured using a camera 160. The resulting predictions generated by the platform 100 during the inference phase using, inter alia, the classifier(s) 130 can be stored in a database or to files on a hard disk, SSD, USB stick or other storage medium. For instance, as shown in FIG. 1, the data generated using the PPE detection platform 100 can be provided to a computing device 180 for storage and/or further action. Computing device 180 can be an on-premise computing system or remote (e.g., cloud-based) computing system. Although shown separately, the computing device 180 can also be part of the computing device on which the PPE detection platform 100 is implemented.

Because the pose estimator 120 can be an expensive system in terms of time and computing resources, it is preferably not used (e.g., bypassed) at inference time in a real-time application. However, in accordance with one or more embodiments, the pose estimator is used at training time to improve the classifier 130 utilized at test (inference) time. Accordingly, FIG. 1 shows the general process flow of information between the elements of the PPE detection platform 100 during the training phase in dashed lines and the process flow during the inference phase in solid lines.

In accordance with a further aspect of the disclosed embodiments, the neural architecture of the classifier 130 is modified by incorporation of a spatial attention mechanism 135, which is realized as part of the classifier 130, and which is trained using supervision signal from the pose estimator 120. In this way, the classifier 130 learns to focus on the personal protective equipment items using the knowledge obtained from the pose estimator during the training phase, with almost no computational overhead during the inference phase. In the exemplary disclosed embodiment, the modification of a special attention mechanism is specific to a deep neural network classifier, accordingly the classifier 130 is a deep neural network classifier. In a non-limiting embodiment, the object detector (e.g., person detector) and the pose estimator are deep neural networks as well. However, in another non-limiting embodiment, the object detector and the pose estimator need not be neural networks.

The disclosed embodiments of the PPE detection platform 100 (or PPE detection system) operate based on a novel deep learning method, a salient component of which is the training of a spatial attention mechanism 135 with supervision of a signal from a pose estimator 120.

Different from existing systems that use image processing systems that require specific markings of the personal protective equipment items, according to a salient aspect, the disclosed embodiments based on a deep learning method are able to recognize items based on a combination of high-level features, including but not limited to shape, color, texture and overall appearance.

Methods that detect personal protective equipment in a single stage are typically less accurate than two-stage methods performing people detection and personal protective equipment recognition. The main issue of methods based solely on object detectors is the inability of object detectors to detect small objects, e.g. helmets or boots, from a far range. Instead of trying to detect these small objects relative to the entire scene, two-stage methods detect people, which are proportionally larger, and then detect objects within the corresponding region. For this reason, the two stage approaches have superior accuracy rates. The disclosed solution is based on a two-stage approach, person detection using the detector 110, followed by PPE detection/classification in the classifier 130.

Existing two-stage deep learning detection methods can detect people wearing helmets using a deep object detector based on multi-level features. However, to progressively encode the multi-level features, such existing systems employ reverse progressive attention (RPA), however, the attention mechanism is trained in a conventional way, namely training attention in the detector. In accordance with one or more of the disclosed embodiments of the PPE detection platform 100, the attention mechanism is trained in a novel and different way from conventional deep learning object detection systems which incorporate attention in the detector, specifically, by employing attention in the classifier. In particular, the systems and methods are configured for training attention maps by minimizing the mean absolute error with respect to a ground-truth attention mask provided by a pose estimator. By using supervision from a pose estimator, embodiments of the PPE detection solution disclosed herein are able to obtain better accuracy rates compared to attention mechanisms based on conventional training (without additional components added to the loss). A spatial attention mechanism is way to constrain neural networks to activate (look for relevant features) only in certain areas of the input image. This is achieved by learning one or more attention maps that are multiplied with the activation maps resulting from a convolutional layer. Since the attention maps contain values between 0 and 1, the element-wise multiplication operation changes the activation maps such that features in regions of interest are kept (they are multiplied with values close or equal to 1) and features in other regions are removed (they are multiplied with values close or equal to 0).

Whereas some existing two-stage systems for helmet detection of bike or motor riders use an object detector to detect people, then, apply a trained convolutional neural network to classify the detected people as being with or without a helmet, the disclosed embodiments utilize an additional system, namely an articulated body pose estimator 120, that provides supervision to a spatial attention module 135 inserted in the neural network classifier 130. This leads to accuracy improvements with an unperceivable computational time increase.

Figure 2:
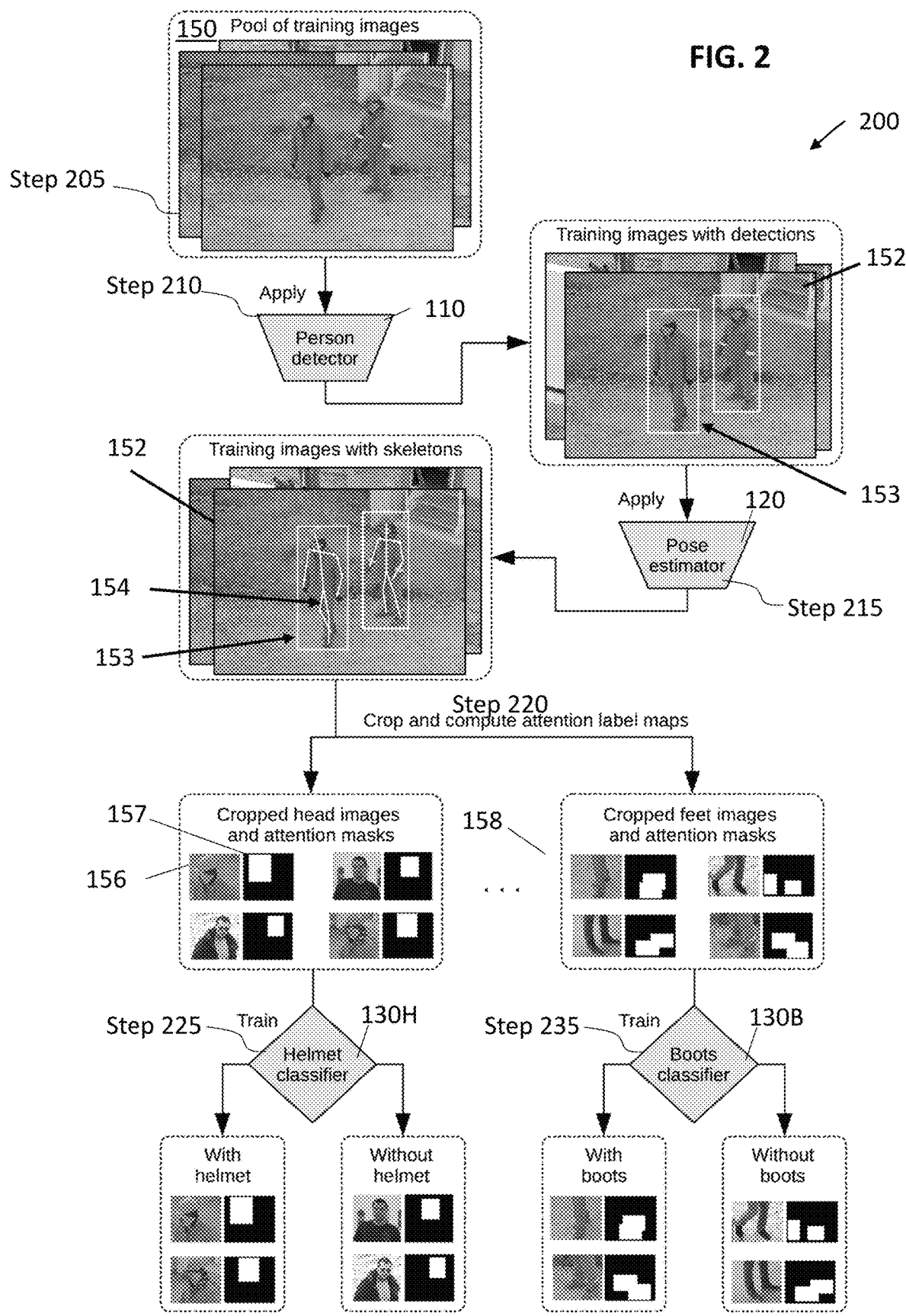
FIG. 2 is a conceptual block diagram illustrating aspects of the exemplary PPE detection system of FIG. 1 and method for training a set of classifiers for detection of specific types of PPE items in accordance with one or more embodiments of the disclosure.

FIG. 2 is a conceptual block diagram illustrating a system and method for training a set of classifiers for detection of PPE items in accordance with one or more embodiments of the disclosure. At training time, the platform 100 comprises a person detector 110, an articulated body pose estimator 120 and one or more PPE classifiers 130.

FIG. 2 illustrates an exemplary method 200 of operation of the platform 100 during training time, in accordance with one or more embodiments. A set of training images 150, which can be stored in memory or on a hard disk, SSD, USB stick or other storage medium, are provided to a person detector 110, at step 205. The person detector, which is configured to detect people from within images using one or more person detection algorithms, is applied to each of the images at step 210. The person detector outputs information representing the location of the persons within the images, such as, bounding boxes encompassing the detected people. FIG. 2 illustrates a given training image 152 with person detections overlaid with bounding boxes 153.

Subsequently, at step 215, a pose estimator 120 is applied on each image region defined by a bounding box. The pose estimator provides, as output, a skeleton 154 of the person/body depicted within the image region. The output skeleton can be a tree structured chain of line segments indicating the location of the detected body parts, e.g., head, torso, arms, legs, and their relative positions/orientations and thereby represents the body pose. FIG. 2 illustrates the output of the pose estimator 120 including the training images 152 with the person detections overlaid with bounding boxes 153 and further overlaid with the corresponding skeleton 154.

From an entire bounding box, say, bounding box 153, a sub-region of the image that can potentially contain a specific item of personal protective equipment, e.g. a helmet, is cropped out at step 220. The image can be cropped by a simple and deterministic procedure that considers some pre-defined ratios with respect to each type of PPE. For example, for the helmet classifier, the procedure crops out the sub-image corresponding to the top third of the bounding box height and the full length of the bounding box width.

Additionally, at step 220, from the corresponding skeleton, an attention mask that indicates the location of the body part of interest inside the crop is constructed. For example, the body part of interest for the helmet classifier 130H is the head. As shown in FIG. 2, the cropped helmet portion of an image is shown as crop image 156 and the corresponding helmet mask is attention mask 157. The cropped out sub-region 156 is provided to the corresponding classifier, e.g. the helmet classifier, at step 225, so as to train the classifier to detect and classify helmets depicted within image frames. Information concerning whether the training images depict a person with or without a helmet is provided to train the classifier as well. For instance, at this point, one or more human annotators can separate images with helmets in one folder and images without helmets into a different folder, thus enabling a supervised training process for the classifier. The labeling process performed by human annotators is performed for each type of PPE in order to train the corresponding classifier.

As shown in FIG. 2 and further described herein, training of the classifier at step 225 is also performed based on the attention masks generated at step 220.

Accordingly, for each category of personal protective equipment item, the system can train a specific classifier, for instance, in the manner shown and described in connection with FIG. 4. As shown in FIG. 2, the PPE item specific classifiers that comprise the classifier 130 can include a helmet classifier 130H and boots classifier 130B.

Figure 3:
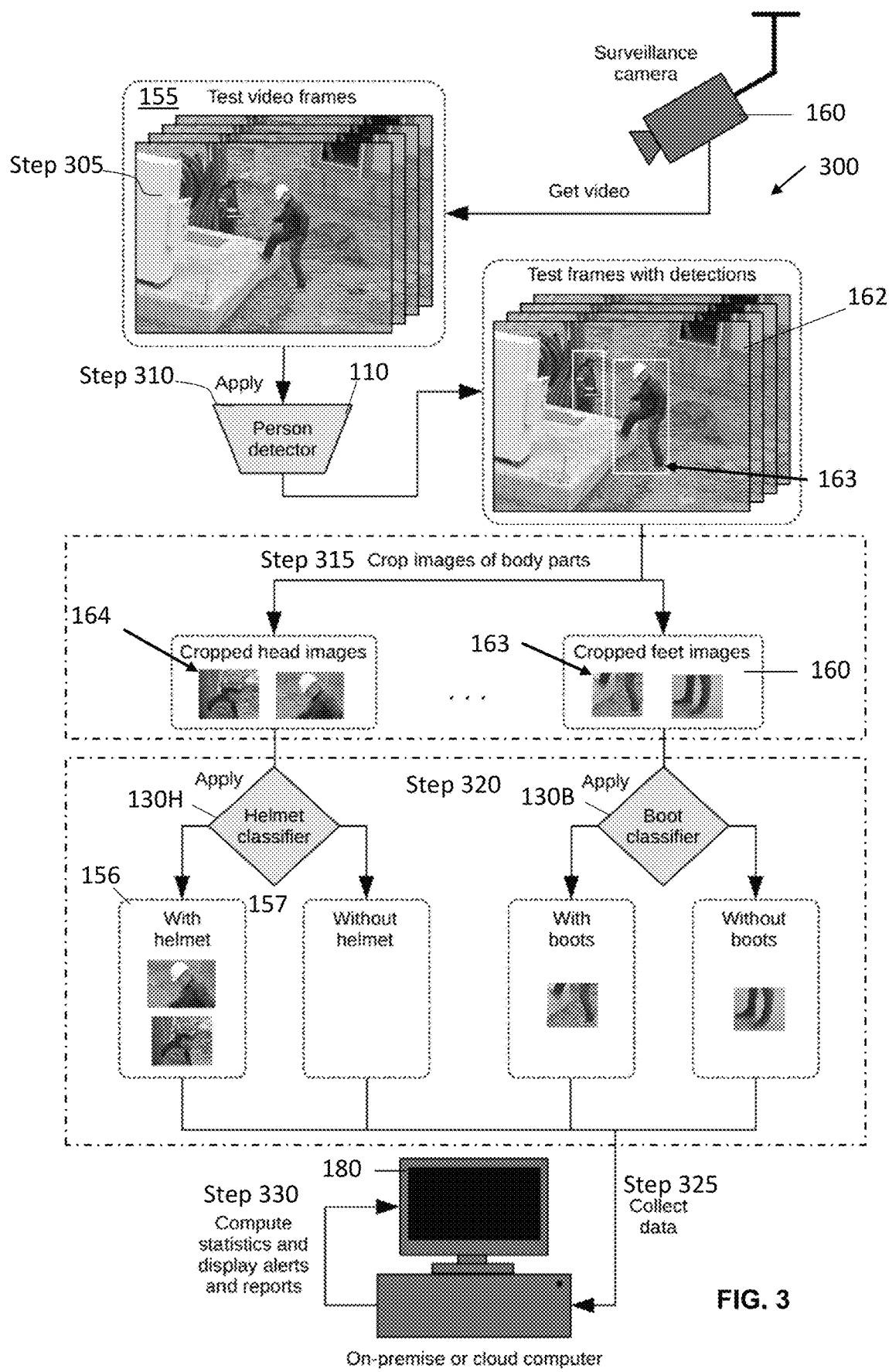
FIG. 3 is a conceptual block diagram illustrating aspects of the exemplary PPE detection system of FIGS. 1-2 and routine for applying a trained set of PPE classifiers to detect PPE items in images and for delivering alerts and reports in accordance with one or more embodiments of the disclosure.

FIG. 3 is a conceptual block diagram illustrating aspects of the PPE detection platform 100 and the corresponding method 300 for, at inference time, detecting specific PPE items using the trained set of PPE classifiers 130 and for delivering alerts and reports in accordance with one or more embodiments of the disclosure. At training time, the platform 100 utilizes the person detector 110, the articulated body pose estimator 120 and the PPE classifiers 130, which comprises helmet classifier 130H and boot classifier 130B. The modules including the person detector and classifiers are installed and running on the PPE detection platform 100 thereby enabling the system to perform the steps for processing of the images 165 as further described herein.

As shown, at step 305, a set of video frames are captured by a surveillance camera 160 and transmitted through HTTP, RTSP or similar network communication connection protocols to a computing device on which the PPE detection platform 100 is implemented.

At step 310, the person detector 110 is applied on each video frame in temporal order. For those image frames in which a person is detected, the person detector provides a bounding box surrounding a region of the image depicting a detection. As shown in FIG. 3, image 162 is associated with a set of two bounding boxes 163 and 164 that respectively correspond to the two detected persons in image 162.

At step 315, from an entire bounding box, a sub-region that can potentially contain a specific kind of personal protective equipment, e.g. a helmet, is cropped out and provided to the corresponding classifier, e.g. the helmet classifier. Cropping is performed by the system implementing a deterministic procedure based on pre-defined ratios with respect to the bounding box that performs the cropping. The cropped regions are provided to the trained classifiers 130 for classification.

A specific classifier, for example the helmet classifier 130H, provides a prediction for each input image, indicating whether the person in the image wears the corresponding personal protective equipment item, for example a helmet, or not. For instance, as shown in FIG. 3, at step 320, the helmet classifier 130H can be configured to categorize images into a "with helmet" category 156 and a "without helmet" category 157 based on the predictions.

At step 325, the resulting predictions are stored in a database or to files on a hard disk, SSD, USB stick or other storage medium. For instance, as shown in FIG. 3, the data generated in connection with the exemplary PPE detection method can be stored in a computing device 180. Computing device 180 can be an on-premise computing system or remote (e.g., cloud) computing system. Computing device can also be part of the computing device on which the PPE detection platform 100 is implemented.

The stored information can be further analyzed at step 330 and used to trigger alerts and generate reports which are displayed on a user interface. The alerts may be delivered in the form of sound alarms, e-mails, text messages, push notifications, etc. The reports may be generated based on aggregating the output of one or more classifiers at various time intervals, e.g. every hour, every day, every week, etc. For each time interval and for each type of PPE, a report may include the number of people wearing and the number of people not wearing the respective type of PPE. These statistics can be further aggregated to determine the percentage of PPE compliance for every time interval. The reports can be presented on a display as bar charts, pie charts or other similar data visualization methods.

Figure 4:
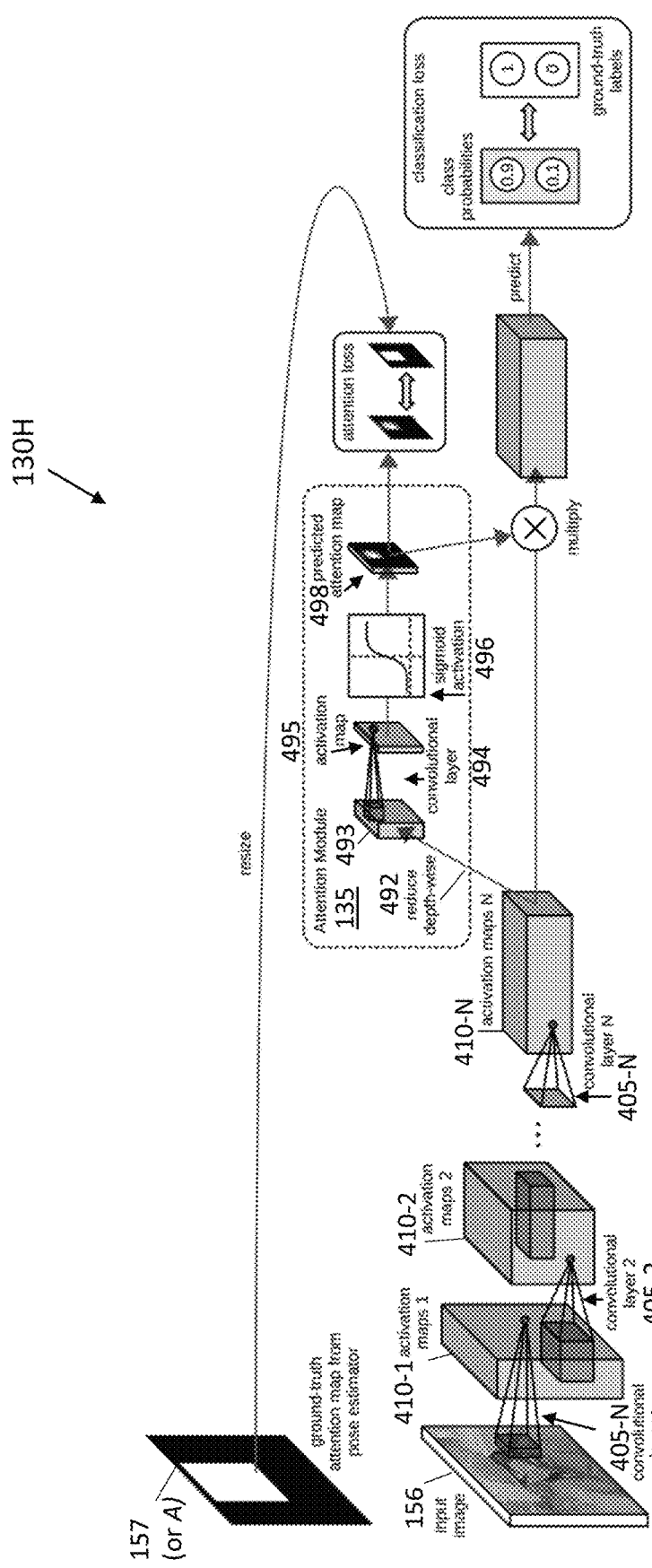
FIG. 4 is a block system diagram of aspects of the exemplary PPE detection system of FIGS. 1-3, particularly, an exemplary neural network classifier during the classifier training phase in accordance with one or more embodiments of the disclosure.

FIG. 4 is a more detailed conceptual system diagram of an exemplary classifier for detecting PPE items from imagery using a neural network classifier trained with classification loss and attention loss in accordance with one or more embodiments of the disclosure. In this exemplary arrangement, the supervision signal for the attention loss component of the classifier is provided by an articulated body pose estimator (not shown). FIG. 4 further illustrates how a specific classifier of the PPE detection platform can be trained.

FIG. 4 provides an illustration of a convolutional neural network classifier trained on images with people wearing helmets or people not wearing helmets, i.e., PPE classifier 130H, however, it should be understood that other PPE classifiers are similarly trained and configured.

The input of the helmet classifier 130H is formed of an image, typically representing the upper body, and an attention mask, typically indicating the location of the body part of interest, e.g. the head. For instance, as shown in FIG. 4, the input image is a cropped image 156. Also provided as an input is the output of the pose estimator (not shown), namely a ground-truth attention map which is represented in FIG. 4 as the attention mask 157.

The input image is passed through a series of convolutional blocks, typically formed of convolutions layers, activation layers, pooling layers or other known layers used in convolutional blocks. FIG. 4, for instance, illustrates convolutional layers 405-1 . . . 405-N and, for each of the convolutional layers an activation map, 410-1 . . . 410-N.

The activation maps from one of the convolutional layers, typically the last convolutional layer, 410-N, are passed to a spatial attention module 135. As shown, the spatial attention module is composed of one or more depth-wise reduction layers 492, a convolutional layer 494, which includes an activation map 495, and a sigmoid activation layer 496. The convolutional neural network is trained to minimize a loss function composed of a classification loss and an attention loss. A convolutional neural network is a deep neural network having at least one convolutional layer. In order to use the spatial attention module, the deep neural network needs to contain at least on convolutional layer that outputs activation maps to be multiplied with the attention maps.

Figure 5:
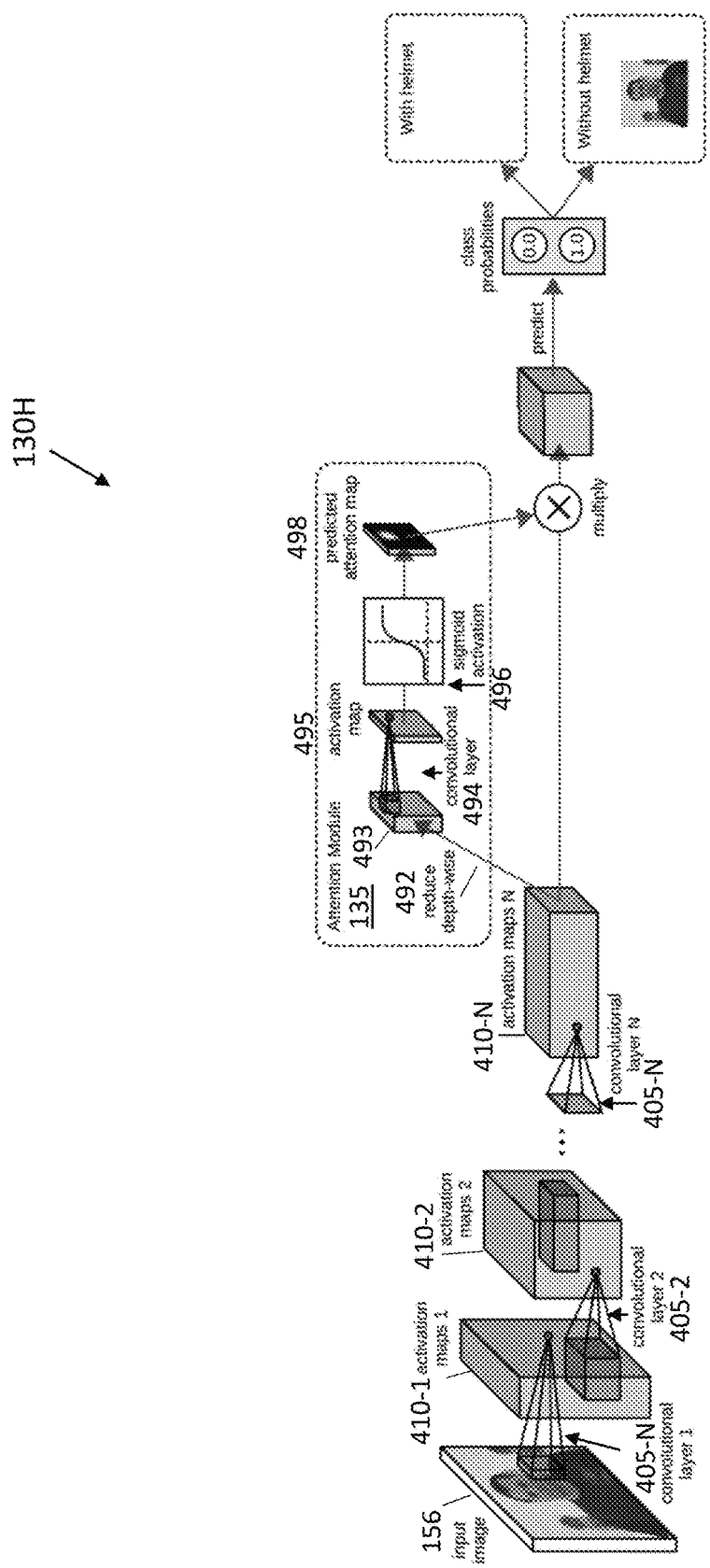
FIG. 5 is a block system diagram of aspects of the system for detecting PPE, particularly, the trained helmet classifier applied on an upper body crop image during the inference phase in accordance with one or more embodiments of the disclosure.

FIG. 5 provides an illustration of an exemplary configuration of the convolutional neural network classifier 130H applied to classify images of people with or without helmets, during the inference phase. As shown, the input image is passed through the neural network comprising convolutional layers 405-1 . . . 405-N, and its spatial attention module 135. The classifier provides a prediction for each input image, indicating whether the person in the image wears a helmet or not.

Additional aspects of the exemplary methods for training the classifier(s) during the training phase and for testing images during the inference phase, as well as the various components of the classifier(s), are further described in greater detail below with continued reference to FIGS. 1-5.

Training Phase

As discussed in connection with FIGS. 2 and 4, in accordance with one or more embodiments of the systems and methods for detecting PPE, during training, the PPE detection platform 100 is configured to perform image processing using three types of sub-systems: a person detector 110, a pose estimator 120, and one or more personal protective equipment classifiers 130. The number of classifiers is determined by the number of distinct types of personal protective equipment that need to be detected. In other words, the exemplary training method can involve training one classifier for each type of personal protective equipment items. For example, the system can be used to train a classifier for helmets (e.g., 130H), a classifier for gloves (not shown), a classifier for boots (e.g., 130B) and so on.

In order to train the classifiers, and optionally the person detector and the pose estimator, the exemplary training method requires a set of training images (and corresponding annotations) stored in memory or on a hard disk, SSD, USB stick or other storage medium. First, the training images 150 are provided, in mini-batches or one by one, to the person detector that outputs bounding boxes 153 enclosing the detected people. Second, the pose estimator is applied on each image region (bounding box), providing as output a skeleton 154 of the body indicating the location of body parts. From an entire bounding box, a sub-region image 156 that can potentially contain a specific personal protective equipment, for example a helmet, is cropped out and provided to the corresponding classifier, for example the helmet classifier 130H. From the corresponding skeleton, an attention mask 157 indicating the location of the body part of interest inside the crop is constructed. For example, the body part of interest for the helmet classifier is the head.

In summary, the input for a classifier is formed of an image, for example the sub-region representing the upper body, and an attention mask, typically indicating the location of the body part of interest, for example the head, within the sub-region. As further described herein and as shown in FIG. 3, during the step of training the classifier, the input image is passed through a series of convolutional blocks, typically formed of convolutions layers, activation layers, pooling layers or other known layers used in convolutional blocks. The activation maps from one of the convolutional layers, typically the last convolutional layer, are passed to a spatial attention module. A classifier is trained by minimizing, jointly or alternatively, an objective composed of a classification loss and an attention loss.

Inference Phase

As discussed in connection with FIGS. 3 and 5, in accordance with one or more embodiments of the systems and methods for detecting PPE, during inference, a set of video image frames are captured by a surveillance camera 160 and transmitted through HTTP, RTSP or similar network communication protocols to a computing device on which the PPE detection platform 100 comprising a person detector 110 and one or more trained PPE detection classifiers 130 are installed and running. The person detector 110 is applied on each video frame in temporal order, providing a bounding box 163 encompassing each detection of a person. The video frames can be provided in mini-batches or one by one. From an entire bounding box, a sub-region that can potentially contain a specific personal protective equipment, for example a helmet, is cropped out and provided to the corresponding PPE-specific classifier among the one or more classifiers 130, for example, the helmet classifier 130H. The cropped regions are provided as input images to the classifiers for classification. At inference time, the classifiers are already trained.

As further described herein and as shown in FIG. 4, to perform PPE prediction using a given PPE classifier, each input image is passed through the classifier's corresponding neural network and its spatial attention module. A specific classifier, for example a helmet classifier 130H, provides a prediction for each input image, indicating whether the person in the image wears the corresponding personal protective equipment item, for example a helmet, or not. The resulting predictions are stored to files or in a database on a hard disk, SSD, USB stick or other storage medium. The stored information can be further used to trigger alerts and generate reports which are displayed on a friendly user interface.

The exemplary configurations and operations of the various subsystems of the exemplary PPE detection platform 100 that are used to perform one or more steps of the exemplary training and/or inference processes are further described below in greater detail.

Person Detector

In accordance with one or more embodiments, the person detector 110 can be a deep neural network or a conventional machine learning system. The person detector can be a system that is pre-trained on another data set of images (before the training phase of the disclosed invention), a system that is pre-trained on another data set of images and fine-tuned during the training phase of the disclosed invention, or a system that is trained from scratch during the training phase of the disclosed invention. During inference, the person detector takes images as input, in mini-batches or one by one. For each input image, the person detector processes the image to detect people in the image. For each person detected in the image, the person detector provides a bounding box as output. The bounding box is a rectangular sub-region of the image that fully encloses a detected person, while preferably being as tight as possible on the detected person. In one or more embodiments, each bounding box can be represented by four coordinates, either two 2-dimensional (2D) points (for example, the top-left corner and the bottom-right corner of the bounding box) or one 2D point (for example, the top-left corner of the bounding box) plus the 2D bounding box size (width and height).

Articulated Body Pose Estimator

In accordance with one or more embodiments, the articulated body pose estimator 120, or pose estimator for short, can be a deep neural network or a conventional machine learning system. The pose estimator can be a system that is pre-trained on another data set of images (before the training phase of the disclosed invention), a system that is pre-trained on another data set of images and fine-tuned during the training phase of the disclosed invention, or a system that is trained from scratch during the training phase of the disclosed invention. During inference, the pose estimator takes images as input, in mini-batches or one by one. For each input image, the pose estimator processes the image to recover the pose of each articulated body in the input image, typically representing the pose as a skeleton. The skeleton is a tree-structured chain with nodes representing body joints (articulated points) and edges representing rigid body segments. Each edge can be associated with a specific body part, for example left forearm, torso or right foot.

Personal Protective Equipment Classifier

In accordance with one or more embodiments, the personal protective equipment classifier module 130 of the PPE detection platform 100 can comprise one or more PPE-specific classifiers, such as helmet classifier 130H, boot classifier 130B and the like.

The exemplary PPE detection classifier described herein with reference to FIGS. 4-5 is the helmet classifier 130H intended for predicting the presence of a helmet in images. Other PPE-specific classifiers, such as boots classifier 130B, safety-vest classifier (not shown) and the like are configured to be trained and operate in a similar fashion.

Each classifier 130, say, classifier 130H, is a deep convolutional neural network equipped with a respective spatial attention module 135 that receives a supervision signal from the pose estimator 120, during the training phase. The deep neural network is typically organized into sequential layers of artificial neurons. Convolutional neural networks are a particular kind of deep neural networks that are designed to efficiently process images through the use of a special kind of layer inspired by the human visual cortex, namely the convolutional layer. A convolutional layer contains a set of filters of the same size. Each filter is convolved over the input tensor (the output of the preceding layer) at certain locations established by a fixed step (stride), producing a so-called activation map. As shown in FIGS. 4-5, deep neural network classifier 130H comprises convolutional layers 405-1 . . . 405-N and corresponding activation maps 410-1 through 410-N.

The convolutional filters learn to encode various features represented in an image. In convolutional layers closer to the input, filters encode low-level features that activate on edges, bars, corners, stains and so on. In convolutional layers closer to the output, filters encode high-level features that activate on certain body parts, textures of various materials, faces and so on. Each convolutional layer can be followed by a non-linear activation layer, a batch-normalization layer, a pooling layer or other known types of layers. Longer connections, such as skip-connections or residual connections, between layers are also possible. A pooling layer is usually added to reduce the spatial dimension of the activation maps, while preserving the number of activation maps. An activation map is the result of applying the convolution operation using a single filter over an input tensor. Since a convolutional layer is formed of multiple filters, the output of a convolutional layer is a set of activation maps, represented as a tensor. The number of output activation maps is equal to the number of convolutional filters. The input tensor is a 3D matrix, for example a digital color-image or a set of activation maps resulting from a preceding convolutional layer.

The most common approaches are max-pooling or average-pooling. In one embodiment of the proposed method, the max-pooling layer added after a convolutional layer operates by selecting the highest value in each location where the max-pooling filter is applied. The intuition is to keep the strongest convolutional filter responses as the input tensor is reduced in size.

In accordance with one or more embodiments, after a certain number of convolutional layers, a spatial attention module is introduced. For instance, the activation maps from one of the convolutional layers, typically the last convolutional layer (e.g., maps 410-N), are passed to a spatial attention module 135, thereby forcing the neural network to focus on the body part of interest with respect to the classification task.

In one exemplary embodiment, the head is the body part of interest, for example when the classification task is to discriminate between people wearing helmets and people not wearing helmets. The spatial attention module 135 is composed of one or more depth-wise reduction layers 492. The goal of a reduction layer is to reduce the depth (third dimension) of the input tensor (a set of activation maps) to one, while preserving the spatial dimension. A reduction layer can apply different rules for the depth-wise reduction operation, for example it can select the maximum value or compute the average. Each reduction layer produces a 2D activation map (not shown) as output. The activation maps from all reduction layers are stacked in the third dimension to form a 3D tensor 493. The tensor is then provided as input to a convolutional layer 494 with a single filter. Being formed of a single filter, the output of the convolutional layer is a single 2D activation map 495 (a matrix). The resulting activation map is passed through a sigmoid activation layer 496, scaling the values inside the activation map to the interval [0,1]. The final activation map 498 is interpreted as an attention mask, also denoted herein by Â.

The attention mask is multiplied element-wise with each activation map that was provided as input to the attention module, as denoted in FIGS. 4-5 by the multiply/X step. The result is a set of activation maps with high filter responses only in the region indicated by the attention mask. To focus on the correct region, the attention mask A is trained, during training phase, in order to minimize an attention loss with respect to a ground-truth attention mask 157, also denoted herein by A. In the case of the classifier 130H shown in FIGS. 4-5, the ground-truth attention mask A is shown as mask 157 and predicted attention map 498 refers to the attention mask Â. The notion of mask or map is alternatively used with the same meaning. The ground-truth attention mask 157 (or A) is automatically computed with the help of a pose estimator (not shown). Since each classifier's goal is to detect a specific kind of personal protective equipment covering a certain body part, the ground-truth activation mask is generated such that it contains a region of interest in the location where the pose estimator found the body part of interest.

In one or more embodiments of the disclosure, the region of interest is indicated as a rectangle filled with the value 1 in the ground-truth attention mask, the rest of the attention mask being filled with the value 0. In another embodiment, the region of interest is indicated as 2D Gaussian function which is centered on the center of region of interest, such that values of 1 in the center gradually decrease to 0, while moving away from the center. If the size of the ground-truth attention mask does not match the size of predicted attention mask coming out of the spatial attention module, the ground-truth attention mask can be rescaled such that the masks have the same size.

As noted, each classifier is trained by minimizing, jointly or alternatively, an objective composed of a classification loss and an attention loss. An exemplary mathematical representation of an exemplary approach to minimizing classification loss is below, followed by an exemplary approach to minimizing attention loss.

Let $X \in \mathbb{R}^{h \times x}$ be an input image of h×w pixels and $y \in \{0,1\}$ a ground-truth label associated to the input image. A classifier acts as a function $f: \mathbb{R}^{h \times w} \rightarrow [0,1]$ with parameters (weights) $W=\{w_j \in \mathbb{R}^{m_j} | j=\overline{1,d}\}$, where d is the depth of the neural network, providing as output a probability ŷ indicating whether the input X belongs to the class y. Then, the parameters W are optimized such that the classifier $f$ is minimizing a classification loss function. In one embodiment of the disclosed invention, the classification loss can be the standard binary cross-entropy:

$$\mathcal{L}_{classification} = -\sum_{i=1}^{n} y_i \cdot \log(\hat{y}_i) + (1 - y_i) \cdot \log(1 - \hat{y}_i),$$

where $\hat{y}_i = f(W, X_i)$, $S = \{(X_i, y_i) | X_i \in \mathbb{R}^{h \times x}, y_i \in \{0,1\}, \forall i = \overline{1,n}\}$ is a training set of images and n is the size of the training set. The goal of the minimization process applied with respect to the classification loss is to obtain a set of weights W such that the output $\hat{y}_i$ for an input image $X_i$ becomes as close as possible to the ground-truth label $y_1$. In this way, the learning (or optimization) process produces a model that can predict correct labels.

In addition to the classification loss function, the enclosing method optimizes the classifier towards minimizing an attention loss function. In one embodiment of the disclosed invention, the attention loss can be the mean absolute error:

$$\mathcal{L}_{attention} = \sum_{i=1}^{n} \sum_{j=1}^{h'} \sum_{k=1}^{w'} |A_{i,j,k} - \hat{A}_{i,j,k}|,$$

where n is the size of the training set, h' and w' are the height and the width of the predicted attention mask, $A_i$ is the ground-truth attention mask associated to the example $X_i$, $\hat{A}_i$ is the predicted attention mask for the example $X_i$, and j and k iterate through the components of the matrices $A_i$ and $\hat{A}_i$. The goal of the minimization process applied on the attention loss is to obtain an attention module that produces an attention mask $\hat{A}_i$ that is as close as possible to the ground-truth attention mask $A_i$ associated to example $X_i$. In this way, the learning process produces an attention module that can predict correct attention masks. In another embodiment of the disclosed invention, the attention loss can be the mean squared error:

$$\mathcal{L}_{attention} = \sum_{i=1}^{n} \sum_{j=1}^{h'} \sum_{k=1}^{w'} (A_{i,j,k} - \hat{A}_{i,j,k})^2,$$

where the notations are the same as above.

In one embodiment of the proposed method, the classification loss and the attention loss are jointly optimized through a single loss function expressed as follows:

$$\mathcal{L}_{joint} = (1-\alpha) \cdot \mathcal{L}_{classification} + \alpha \cdot \mathcal{L}_{attention}$$

where $\alpha$ is a parameter between 0 and 1 that controls the balance between the classification loss and the attention loss. Adding the attention loss in the training objective typically improves the classification accuracy by 1-3%.

In one or more embodiments of the disclosure, the convolutional neural network(s) 130 can be trained using stochastic gradient descent or other variants of gradient descent, minimizing the joint loss function defined above. The training process is based on alternating two steps, a forward pass and backward pass, until the model's predictive error is sufficiently low. The forward pass consists of passing the training data, typically a mini-batch of images, through the model in order to predict the corresponding class labels. In the backward pass, the error (loss) between the ground-truth labels and the current predictions is used to update the model's weights in order to reduce its error. Gradients are computed and back-propagated through the network using the chain rule. After computing the gradients, the weights are adjusted in the negative direction of the gradient (down the slope of the loss function), towards a minimum error value. After several iterations (epochs) over the training data, the gradient descent algorithm is supposed to find the model's weights that minimize the prediction error on the training set. In another embodiment of the disclosed invention, the convolutional neural network can be trained using evolutionary strategies.

During inference, the trained personal protective equipment classifier, e.g., helmet classifier 130H as shown in FIG. 5, takes images as input, in mini-batches or one by one. For each input image, the personal protective equipment classifier processes the image in a forward pass, predicting a label indicating the corresponding class. For each classifier, there are two possible classes, one indicating that the person represented in the input image is wearing a certain kind of personal protective equipment, for example helmet, gloves etc., and another one indicating that the person represented in the input image is not wearing the respective kind of personal protective equipment. It is important to note that, during inference, the ground-truth attention masks are no longer needed, since these are used only at training time to compute the attention loss. Therefore, the articulated body pose estimator is not required at inference time, significantly reducing the processing time of the exemplary PPE detection platform 100. Since only the person detector and the classifiers are employed during inference, an input video stream can be processed in real-time with modern neural network architectures for the person detector 110 and the classifiers 130.

Figure 6:
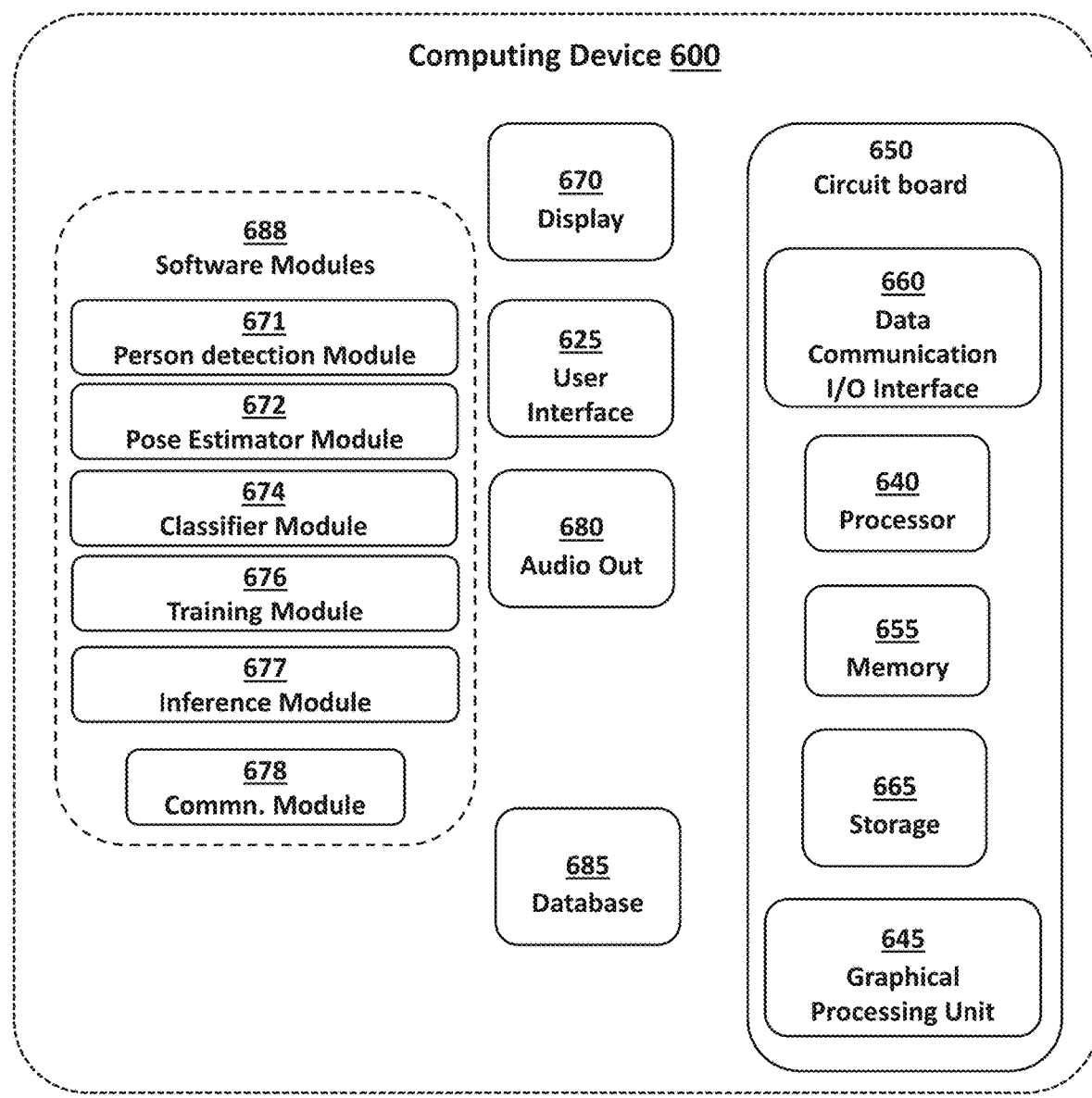
FIG. 6 is a block diagram of an exemplary computing device of the PPE detection system in accordance with one or more embodiments of the disclosure.

FIG. 6 is a block diagram illustrating an exemplary configuration of a computing device 600 for implementing one or more aspects of the PPE detection system 10, particularly, the computer-implemented PPE detection platform 100. As shown, the computing device 600 can be arranged with various hardware and software components that serve to enable operation of the PPE detection platform 100. It should be understood that other computing and electronics devices used in the various embodiments of the disclosure, such as the computing device 180, can include similar hardware and software components as shown and described in FIG. 6.

Components of the computing device include a processor 640 that is shown in FIG. 6 as being disposed on a circuit board 650. The circuit board can also include a graphical processing unit 645, a memory 655, a data communication/input-output interface 660 and a computer readable storage medium 665 that are accessible by the processor 640. The circuit board 650 can also include or be coupled to a power source (not shown) source for powering the computing device. The graphical processing unit can optionally be used to speed up the computations inside deep neural networks through the parallelization of the mathematical operations involved in such computations.

Data communications and I/O interface 660 can include any number of suitable data input/output interfaces suitable for receiving test or training images from one or more sources such as a camera or local or remote storage, such as Ethernet, universal serial bus (USB), secure digital (SD) card, I2C and universal asynchronous receiver transmitter (UART).

The processor 640 and/or the circuit board 650 can also be coupled to a display 670, for visually outputting information to an operator (user), a user interface 625 for receiving operator inputs, and a audio output 680 for providing audio feedback as would be understood by those in the art. As an example, the processor 640 could generate an image rendering signal that causes a computer resource asset, the display 670, for instance, to display at least a portion of the image received and processed by the platform 100 and alerts relating to whether any PPE items are detected in one or more of the images. Although the various components are depicted either independent from, or part of the circuit board 650, it can be appreciated that the components can be arranged in various configurations.

The processor 640 serves to execute software instructions that can be loaded into the memory 655. The processor 640 can be implemented using multiple processors, a multi-processor core, or some other type of processor. The memory 655 is accessible by the processor 640, thereby enabling the processor 640 to receive and execute instructions stored on the memory 655 and/or on the computer readable storage medium 665. Memory 655 can be implemented using, for example, a random-access memory (RAM) or any other suitable volatile or non-volatile computer readable storage medium. In addition, memory 655 can be fixed or removable.

The computer readable storage medium 665 can also take various forms, depending on the particular implementation. For example, the computer readable storage medium 665 can contain one or more components or devices such as a hard drive, a flash memory, a rewritable optical disk, a rewritable magnetic tape, or some combination of the above. The computer readable storage medium can also be fixed or removable or remote such as cloud-based data storage systems (remote memory or storage configuration not shown). The computer readable storage medium, for example, can be used to maintain a database 685, which stores information relating to results/predictions generated by the classifier during the inference phase, training images and related data utilized during the training phase, and/or data used or generated while carrying out operations and implementing aspects of the systems and methods disclosed herein.

One or more software modules 688 are encoded in the memory 655 and/or the computer readable storage medium 665. The software modules 688 can comprise one or more software programs or applications having computer program code or a set of instructions executed by the processor 640. Such computer program code or instructions for carrying out operations and implementing aspects of the systems and methods disclosed herein can be written in any combination of one or more programming languages. While the software modules 688 are stored locally in computer readable storage medium 665 or memory 655 and execute locally in the processor 640, the processor 640 can interact with remotely computing devices via communication interface 660, and via a local or wide area network to perform calculations, analysis and/or any other operations described herein.

During execution of the software modules 688, the processor 640 is configured to perform the various operations described herein, including without limitation, the PPE detection platform training operations performed during the training phase and image testing operations performed during the inference phase. The software modules 688 can include code for implementing the aforementioned steps and other steps and actions described herein, for example and without limitation: a person detection module 671, which configures the computing device to execute the steps described above as being performed using the person detector 110; a pose estimator module 672 which configures the computing device to execute the steps described above as being performed using the pose estimator 120; a classifier module 674 which configures the computing device to execute the steps described above as being performed using the classifier 130, a training module 676, which configures the computing device to implement the steps described above relating to training the classifier(s) 130, which comprises one or more PPE-specific classifiers (e.g., helmet classifier 130H, boots classifier 130B, safety vest classifier, gloves classifier, mask classifier, and the like); an inference module 677, which configures the computing device to implement the steps described above for detecting PPE within images using, inter alia, the trained classifier(s) 130; and a communication module 678, which configures the processor 640 to communicate with remote devices over a communication connection such as a communication network or any wired or wireless electronic communication connection.

The program code of the software modules 688 and one or more of the non-transitory computer readable storage devices (such as the memory 655 and/or the computer readable storage medium 665) can form a computer program product that can be manufactured and/or distributed in accordance with the present disclosure.

It should be understood that various combinations, alternatives and modifications of the disclosure could be devised by those skilled in the art. The disclosure is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for determining whether persons depicted in images are wearing personal protective equipment, the system comprising:
   a PPE detection platform comprising:
      an input-output interface for receiving images depicting one or more persons;
      a person detector configured to detect a person depicted in an image among the images and output information representing a location of a portion of the image in which the person is detected; and a personal protective equipment (PPE) classifier, wherein the PPE classifier is a deep neural network classifier trained to determine whether or not a PPE item is present in the portion of the image in which the person was detected by the person detector, and wherein the PPE classifier comprises:

a trained spatial attention module, wherein the PPE classifier is trained to determine whether or not the PPE item is present in the portion of the image as a function of the trained spatial attention mechanism, and wherein the PPE classifier is configured to generate an output as a result of determining whether or not the PPE item is present in the portion of the image, wherein, during a training phase, the received images include training images and the PPE detection platform further comprises:

a body pose estimator configured to estimate the pose of any persons detected in the training images by the person detector and output a spatial attention supervision signal based on the estimated pose, and wherein the spatial attention module is trained as a function of the spatial attention supervision signal output by the body pose estimator, and wherein, during an inference phase, the received images include testing images captured by a video camera, and wherein the PPE detection platform is configured to bypass the body pose estimator during the inference phase.

2. The system of claim 1, wherein the output of the person detector is provided to the body pose estimator during the training phase, and wherein, during the inference phase, the output of the person detector is provided to the PPE classifier and thereby bypassing the pose estimator.

3. The system of claim 1, further comprising a plurality of PPE classifiers trained to detect a respective type of PPE item among a plurality of types of PPE items including, masks, gloves, helmets, safety-vests, wherein each PPE classifier is trained to detect a respective type of PPE item based on a combination of high-level features comprising shape, color, texture and overall appearance.

4. The system of claim 1, wherein the person detector is a deep neural network.

5. The system of claim 1, further comprising a video camera in data communication with the PPE detection platform via the input-output interface and, wherein the images are video frames captured by the camera.

6. A computer-implemented method for analyzing imagery to detect whether any persons in the image are wearing personal protective equipment (PPE), the method comprising:

receiving, by a PPE detection platform via an input-output interface during an inference phase, images depicting one or more persons;

processing, by a person detector of the PPE detection platform, an image among the images to detect a person depicted in the image and output information representing a location of a portion of the image in which the person is detected, predicting, with a PPE classifier of the PPE detection platform, whether or not the portion of the image in which the person was detected depicts a person wearing a PPE item, wherein the PPE classifier is a deep neural network classifier and comprises a spatial attention mechanism, and wherein the PPE classifier is trained to predict whether images depict one or more persons wearing the PPE item or depict one or more persons not wearing the PPE item as a function of the trained spatial attention mechanism;

outputting, by the PPE detection platform, the result of the predicting step, wherein, in response to predicting that the image does not depict a person wearing the PPE item, outputting the result includes:

sending an image rendering signal to cause a computer resource asset to display at least the portion of the image depicting the detected person and an alert indicating that the person is not wearing the PPE item, during a training phase that precedes the inference phase, training the PPE classifier using a set of training images that includes images of persons in different poses, images depicting persons wearing PPE items and images depicting persons that are not wearing PPE items, the training process comprising, for each training image among the training images:

detecting, by the person detector, a person depicted in the training image and a location of a portion of the training image in which the person is depicted;

determining, with a pose estimator, a pose of the person depicted in the portion of the training image;

generating, a supervision signal regarding the determined pose of the person in the training image, wherein the supervision signal is output by the pose estimator to the spatial attention mechanism of the PPE classifier; and training the PPE classifier, wherein training the PPE classifier includes:

providing, to the PPE classifier, the portion of the training image including the detected person and a ground-truth label corresponding to the training image, the ground-truth label representing whether or not the portion of the training image depicts a person wearing the PPE item, processing, with the PPE classifier, the portion of the training image in view of the label, and modifying the PPE classifier by training the spatial attention mechanism using the supervision signal output by the pose estimator for the training image, wherein, during the training phase, the output of the person detector from the detection step is provided to the body pose estimator, and wherein, during the inference phase, the output of the person detector from the detection step is provided to the PPE classifier and thereby bypassing the body pose estimator.

7. The method of claim 6, wherein the PPE classifier is a convolutional neural network that is trained by minimizing one or more of a classification loss and an attention loss, wherein the classification loss is computed based on the ground-truth label associated with the training image and wherein the attention loss is computed based on the spatial attention supervision signal output by the body pose estimator for the training image.

8. The method of claim 6, wherein the spatial attention signal comprises a ground-truth attention mask.

9. The method of claim 6, further comprising: receiving during the inference phase the images from a video camera.

10. The method of claim 6, wherein the PPE classifier comprises a plurality of PPE classifiers trained to detect a respective type of PPE item among a plurality of types of PPE items.

11. A non-transitory computer readable storage medium containing computer program instructions for analyzing imagery to detect whether any persons in the image are wearing personal protective equipment (PPE), the program instructions, when executed by a processor, causing the processor to:

receiving, by a PPE detection platform via an input-output interface during an inference phase, images depicting one or more persons;

processing, by a person detector of the PPE detection platform, an image among the images to detect a person depicted in the image and output information representing a location of a portion of the image in which the person is detected, predicting, with a PPE classifier of the PPE detection platform, whether or not the portion of the image in which the person was detected depicts a person wearing a PPE item, wherein the PPE classifier is a deep neural network classifier and comprises a spatial attention mechanism, and wherein the PPE classifier is trained to predict whether images depict one or more persons wearing the PPE item or depict one or more persons not wearing the PPE item as a function of the trained spatial attention mechanism; and outputting, by the PPE detection platform, the result of the predicting step, wherein, in response to predicting that the image does not depict a person wearing the PPE item, outputting the result includes:

sending an image rendering signal to cause a computer resource asset to display at least the portion of the image depicting the detected person and an alert indicating that the person is not wearing the PPE item, wherein the program instructions, when executed by the processor, cause the processor to, during a training phase that precedes the inference phase, train the PPE classifier using a set of training images that includes images of persons in different poses, images depicting persons wearing PPE items and images depicting persons that are not wearing PPE items, the training process comprising, for each training image among the training images:

detecting, by the person detector, a person depicted in the training image and a location of a portion of the training image in which the person is depicted;

determining, with a pose estimator, a pose of the person depicted in the portion of the training image;

generating, a supervision signal regarding the determined pose of the person in the training image, wherein the supervision signal is output by the pose estimator to the spatial attention mechanism of the PPE classifier; and training the PPE classifier, wherein training the PPE classifier includes:

providing, to the PPE classifier, the portion of the training image including the detected person and a ground-truth label corresponding to the training image, the ground-truth label representing whether or not the portion of the training image depicts a person wearing the PPE item, processing, with the PPE classifier, the portion of the training image in view of the label, and modifying the PPE classifier by training the spatial attention mechanism using the supervision signal output by the pose estimator for the training image, wherein, during the training phase, the output of the person detector from the detection step is provided to the body pose estimator, and wherein, during the inference phase, the output of the person detector from the detection step is provided to the PPE classifier and thereby bypassing the body pose estimator.

12. The non-transitory computer readable storage medium in claim 11, wherein the PPE classifier is a convolutional neural network that is trained by minimizing one or more of a classification loss and an attention loss, wherein the classification loss is computed based on the ground-truth label associated with the training image and wherein the attention loss is computed based on the spatial attention supervision signal output by the body pose estimator for the training image.

13. The non-transitory computer readable storage medium in claim 11, wherein the spatial attention signal comprises a ground-truth attention mask.

14. The non-transitory computer readable storage medium in claim 11, wherein the computer-implemented process further comprises: receiving during the inference phase the images from a video camera.

15. The system of claim 1, wherein the spatial attention module is configured by training to cause the deep neural network classifier to look for features of the PPE item within certain areas of the portion of the image.

* * * * *